June 26, 1956 R. J. NORRIS 2,752,477
BROILER UNIT FOR ELECTRIC COOKING RANGES
Filed March 26, 1954 3 Sheets-Sheet 1

INVENTOR.
Ralph J. Norris
BY Chas. H. Trotter
Atty.

June 26, 1956  R. J. NORRIS  2,752,477
BROILER UNIT FOR ELECTRIC COOKING RANGES
Filed March 26, 1954  3 Sheets-Sheet 2
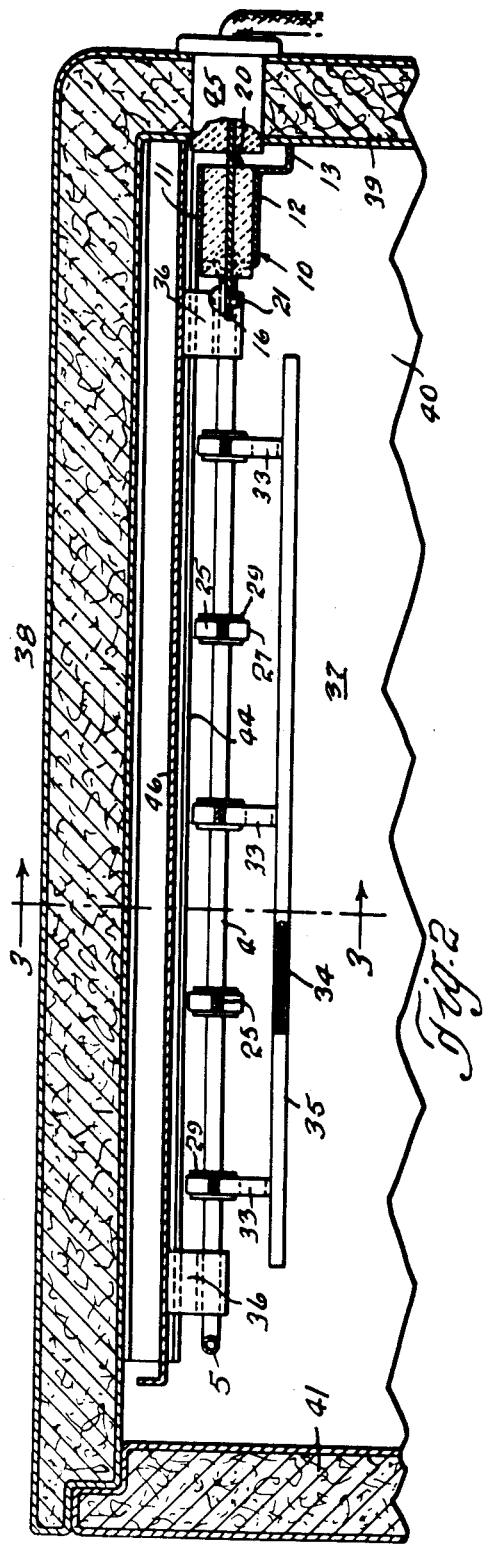
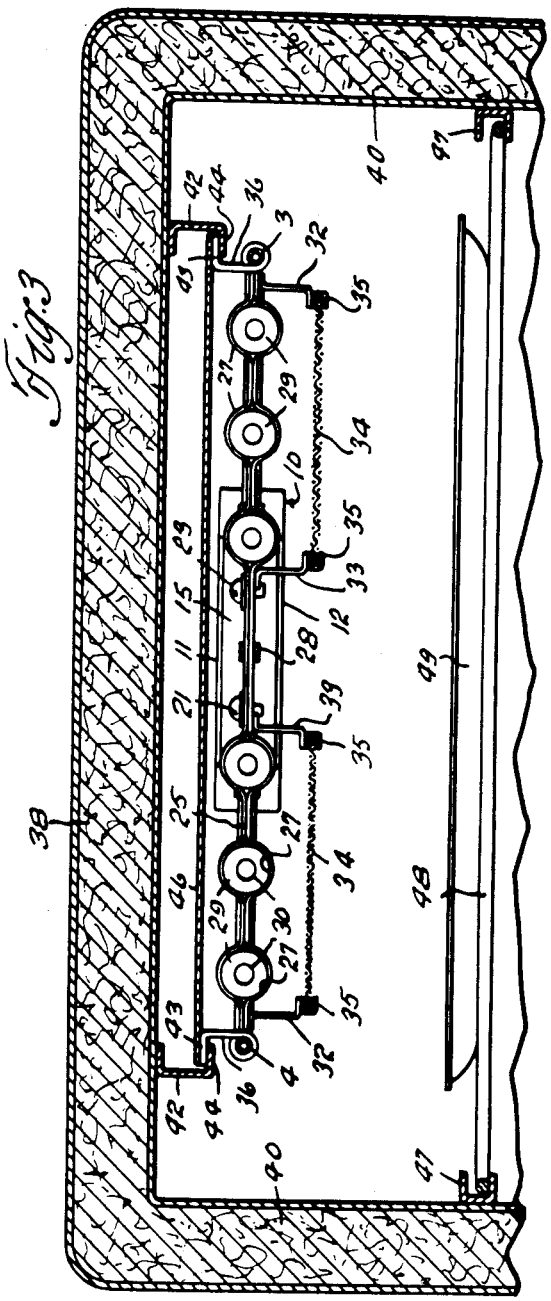
INVENTOR.
*Ralph J. Norris*
BY
*Chas. H. Trotter*
Atty.

June 26, 1956  R. J. NORRIS  2,752,477
BROILER UNIT FOR ELECTRIC COOKING RANGES
Filed March 26, 1954  3 Sheets-Sheet 3
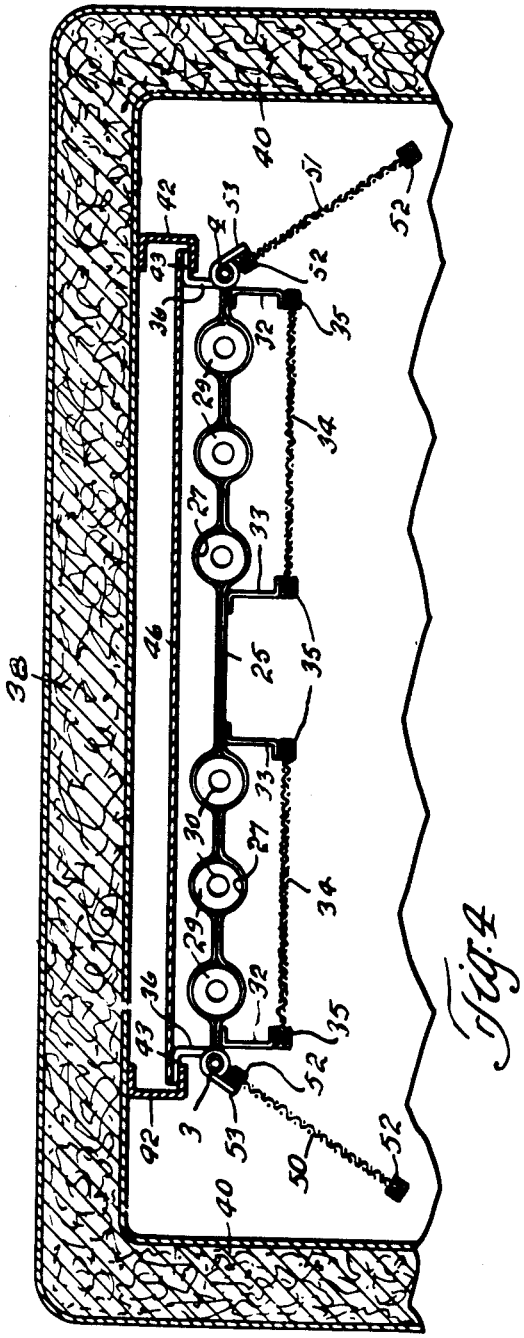
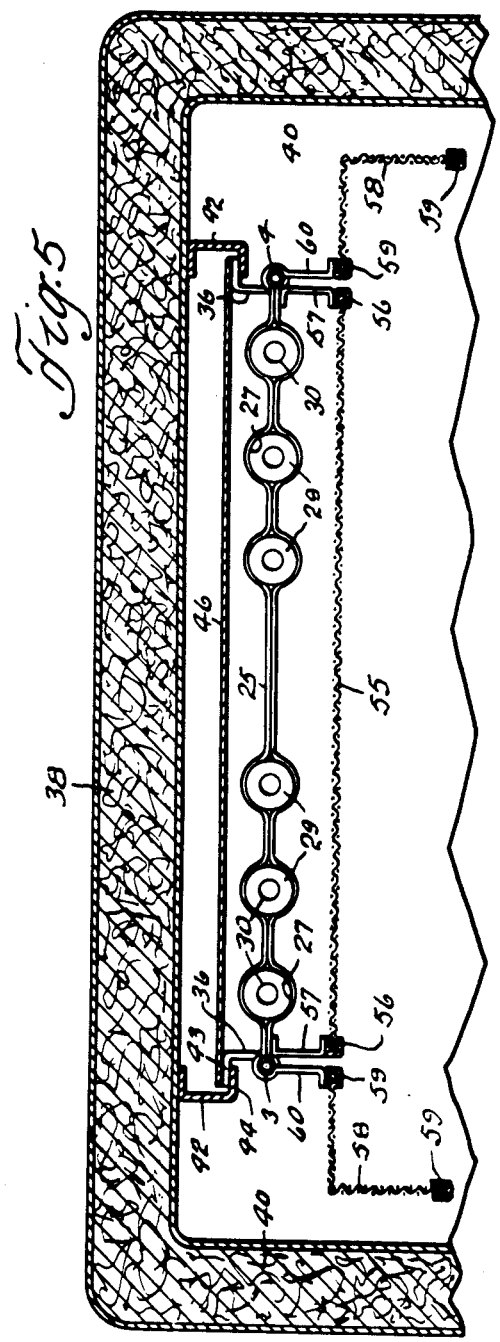
INVENTOR.
Ralph J. Norris
BY Chas. H. Trotter
Atty.

United States Patent Office 2,752,477
Patented June 26, 1956

2,752,477

BROILER UNIT FOR ELECTRIC COOKING RANGES

Ralph J. Norris, Mansfield, Ohio, assignor to The Tappan Stove Company, Mansfield, Ohio, a corporation of Ohio Application March 26, 1954, Serial No. 418,979

12 Claims. (Cl. 219—37)

This invention relates to broiler units for use in electric cooking ranges, and this application is a comtinuation-in-part of my copending application Serial No. 227,766, filed May 23, 1951, and Serial No. 354,204, filed May 11, 1953.

Electric range broiler units usually consist of an exposed long helix of resistance wire which is threaded back and forth through a number of insulating spools which are carried by a suitable frame. The unit is mounted in the range oven close to the top wall thereof. Meat to be broiled is placed on a broiler pan which is supported by a vertically adjustable rack under the broiler unit. When energized the heating coil or element becomes cherry red and maintains a temperature of the order of 1600° Fahrenheit. During broiling globules of grease form on top of the meat being broiled under the unit. Many of these globules are thrown up into contact with the exposed heating element, and other globules are thrown directly out onto the side walls of the oven. As globules come into contact with the heating element they are in effect exploded by the very high temperature of the element and portions of the globules are thrown out against the oven side walls, while other portions thereof stick to the element and flash into flame. The grease thrown against the oven walls is so hot that when it strikes the cooler oven walls it adheres tightly thereto and solidifies thereon. After use when the oven cools the grease solidifies still more and is extremely hard to remove, generally necessitating scraping of the oven walls to remove therefrom. On bright oven walls, such as chromium plated walls, the grease usually leaves dark spots thereon. The grease which sticks to and is burned by the heating element creates a dense, greasy objectionable smoke which deposits a film of grease on anything it comes in contact with. The globules of grease which are thrown from broiling units directly onto the oven walls can be easily wiped off, if this is done, as it should be, after each use of the oven.

It is an object of the invention to substantially eliminate this spattering of the oven walls with very hot grease and to eliminate the objectionable smoke incidental to the broiling of meats, especially if there is any fat thereon. To this end I interpose a metal screen between the broiler heating element and the broiler pan on which meat is broiled. I preferably attach the screen to the lower ends of hangers which are secured to and extend downwardly from the broiler unit frame so that it constitutes an integral part of the broiler unit. The screen may be either of the expanded metal type or of the wire mesh type made from high heat resistant non-corrosive alloy steel such as high chrome alloy steel or chrome nickel alloy steel. The thickness of metal or the diameter of the wire used may vary between 18 and 24 gauge, the mesh of the screen may vary between one fourth (¼) of an inch and three thirty-seconds (³⁄₃₂) of an inch, and the distance between the screen and the heating element may vary between one fourth (¼) of an inch and one (1) inch. There is a direct relationship between the gauge of the screen, the mesh of the screen and the distance between the screen and the heating element in that the larger the gauge, the larger the mesh, and the closer the screen to the heating element. For example, the mesh of a screen made from 18 gauge metal is one fourth (¼) inch and the screen is disposed approximately three eights (⅜) of an inch below the heating element; the mesh of a screen made from 20 gauge metal is three sixteenths (³⁄₁₆) of an inch and the screen is disposed approximately five eighths (⅝) of an inch below the heating element; the mesh of a screen made from 22 gauge metal is one eighth (⅛) of an inch and the screen is disposed approximately three fourths (¾) of an inch below the heating element; and the mesh of a screen made of 24 gauge metal is three thirty-seconds (³⁄₃₂) of an inch and the screen is disposed approximately one inch below the heating element. With my improved broiler unit the flying globules strike the interposed screen which keeps them from coming into contact with the very hot incandescent heating element. During use the temperature of the interposed screen is in the neighborhood of 800° to 900° Fahrenheit which is not high enough to explode the globules of grease and cause them to fly out against the oven walls and/or flash into flame. The globules of grease striking the interposed screen remain thereon and are slowly oxidized without smoking. Part of the oxidized globules pass out through the oven vent in dust form and the remainder thereof can be easily wiped from the screen after use. In use the heating element in my improved unit heats the interposed screen and it in turn does the actual broiling. Although the temperature of the interposed screen is considerably less than that of the heating element, it is nevertheless hot enough, since 800° to 850° Fahrenheit is sufficient for satisfactory broiling. If meat to be broiled is placed under my broiler unit immediately upon the energizing thereof the interposed screen increases the broiling time slightly, but if the unit is allowed to preheat a minute or two before the meat is placed thereunder the broiling time will not exceed that of prior units.

The principal object of this invention is to provide the electric resistance broiler element of an electric cooking range with simple and efficient means which will substantially eliminate the spattering of the oven walls with grease during broiling.

Other and more limited objects of the invention will be apparent from the following specification and the accompanying drawings forming a part thereof wherein:

Fig. 2 is a vertical section through a cooking range oven from front to rear thereof showing the broiler unit of Fig. 1 mounted therein, the plane of the section through the broiler unit being indicated by the line 2—2 of Fig. 1;

Fig. 3 is a vertical section through the cooking range oven of Fig. 2 from side to side thereof as indicated by the line 3—3 of Figs. 1 and 2;

Fig. 4 is a view similar to Fig. 3 showing a slightly modified form of the invention; and Fig. 5 is a view similar to Figs. 3 and 4 showing another modification of the invention.

Figure 1:
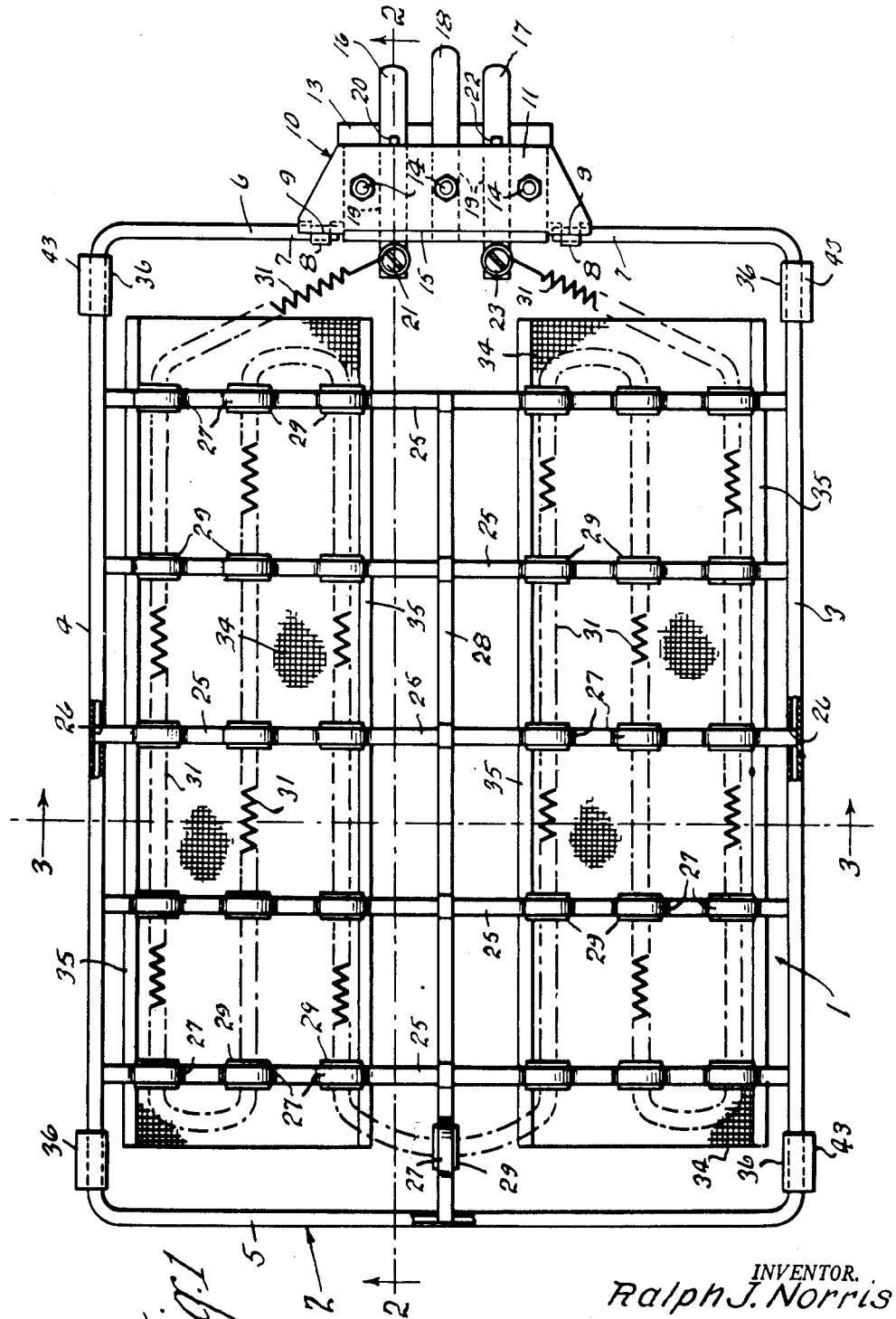
Fig. 1 is a plan view of an electric broiler unit constructed according to my invention.

Referring now to the drawings by reference characters, the numeral 1 indicates generally an electric broiler unit constructed according to my invention. The unit 1 comprises a rectangular frame, formed from a single length of metal tubing 2, having the spaced parallel side sections 3 and 4 and the end sections 5 and 6. The ends 7 terminate short of each other in the end section 6 and are rigidly secured in sockets 8 formed in the vertical end wall 9 of a U-shaped clamp 10 having the spaced parallel top and bottom walls 11 and 12 which are connected together by the end wall 9. A porcelain block 13 is secured between the top and bottom walls 11 and 12 of the clamp 10 by three bolts 14. The rear wall 9 is cut away between the sockets 8 as indicated at 15 to accommodate the block 13. A pair of electrical connector prongs 16 and 17 and a guide prong 18 are carried by the block 13 in slots 19 formed therein. The terminal prong 16 is held in position in its slot 19 by a depressed tongue 20 and the terminal screw 21 carried thereby; and the connector prong 17 is held in position in its slot 19 by a similar tongue 22 and terminal screw 23. The guide prong 18 is held in position by the center bolt 14 which passes through the prong 18. A plurality of spaced parallel spool supports 25 are carried by and extend between the side sections 3 and 4 of the frame. The ends of the spool supports are inserted into slots 26 in the side sections 3 and 4, and each spool support 25 consists of two similar opposed thin narrow metal strips which are shaped to provide a plurality of spaced spool sockets 27 and are welded together between adjacent sockets. The supports 25 are connected together midway between the side sections 3 and 4 by brace 28 which is likewise made up of two opposed thin narrow strips spot welded together. An insulating spool 29 having an axial bore 30 is secured in each of the spool sockets 27. An electrical resistance heating element 31, consisting of a long wire helix, is wound back and forth through the spools 29 and has the ends thereof connected to the connector prongs 16 and 17 by the terminal screws 21 and 23.

Alternate spool supports 25 each have two pairs of downwardly extending legs 32 and 33 spot welded to the underside thereof. The legs 32 are disposed adjacent the side sections 3 and 4 and the legs 33 are disposed one on each side of the central brace 28. A wire screen 34 having the longitudinal edges thereof clamped between U-shaped strengthening strips 35 is secured to and between each pair of legs 32—33 by having the strengthening strips 35 spot welded to the lower ends of the legs 32—33. As previously stated in the preamble hereof the screens 34 may be either of the expanded metal type or the wire mesh type made from high heat resistant non-corrosive alloy steel such as high chrome alloy steel or chrome nickel alloy steel. The thickness of metal or the diameter of the wire used may vary between 18 and 24 gauge, the mesh of the screen may vary between one fourth (¼) of an inch and three thirty-seconds (³⁄₃₂) of an inch, and the distance between the screen and the heating element may vary between one fourth (¼) of an inch and one (1) inch. There is a direct relationship between the gauge of the screen, the mesh of the screen and the distance between the screen and the heating element in that the larger the gauge, the larger the mesh, and the closer the screen to the heating element. For example, the mesh of a screen made from 18 gauge metal is one fourth (¼) inch and the screen is disposed approximately three eighths (⅜) of an inch below the heating element; the mesh of a screen made from 20 gauge metal is three sixteenths (³⁄₁₆) of an inch and the screen is disposed approximately five eighths (⅝) of an inch below the heating element; the mesh of a screen made from 22 gauge metal is one eighth (⅛) of an inch and the screen is disposed approximately three fourths (¾) of an inch below the heating element; and the mesh of a screen made from 24 gauge metal is three thirty-seconds (³⁄₃₂) of an inch and the screen is disposed approximately one (1) inch below the heating element.

In Figs. 2 and 3 the broiler unit 1 is shown mounted in position in an oven 37 having a top wall 38, a rear wall 39 and a pair of side walls 40. The front of the oven 37 is closed by a door 41. A pair of spaced parallel supports 42 are secured to the inner face of the top wall 38 of the oven 37 and extend substantially from the front to the rear of the oven. When the broiler unit 1 is in position in the oven 37 the outwardly extending upper ends 43 of the hangers 36 slidably engage the top surface of the inwardly extending lower ends 44 of the supports 42, and the prongs 16, 17 and 18 carried by the porcelain block 13 extend into slots in an electric socket 45 mounted in the rear wall 39 of the oven 37. A thin sheet metal reflector plate 46 slidably rests upon the tops of the hangers 36 and covers the unit 1.

The side walls 40 of the oven 37 are provided with a plurality of pairs of opposed vertically spaced channel tracks 47 between each pair of which a rack 48 is adapted to be slidably mounted. In broiling, meat to be broiled is placed upon a broiler pan 49 which is supported by the rack 48. By shifting the rack from one pair of rails to another the distance between the broiler pan and the broiler unit may be adjusted as desired.

In Fig. 4 I have shown the unit 1 provided with a pair of outwardly and downwardly flaring screens 50 and 51 similar to the screens 34. The upper and lower edges of the screens 50 and 51 are clamped between the legs of U-shaped stiffening strips 52. The screens 50 and 51 extend substantially the full length of the side sections 3 and 4 and are rigidly secured thereto by strips 53. Otherwise this form of the invention is the same as that shown in Figs. 1 to 3 and the same reference numerals are applied to like parts. The screens 50 and 51 are provided to intercept and collect any globules of grease which may be thrown upwardly and outwardly from broiling meat along the sides of the broiler pan 49. The globules of grease collected by the side screens 50 and 51 are slowly oxidized without smoking and pass out through the oven vent in dust form.

In the form of the invention shown in Fig. 5 I have substituted a single screen 55 for the two screens 34 shown in Figs. 1 to 4. The screen 55 extends from side to side of the unit 1 and substantially the full length thereof. The longitudinal edges of the screen 55 are provided with elongated U-shaped stiffening strips 56. The screen 55 is rigidly secured in place by a plurality of hangers 57. A pair of angular side screens 58 having their longitudinal edges provided with stiffening strips 59 are rigidly secured to the side sections 3 and 4 of the frame at each side of the screen 5 by a plurality of hangers 60. Otherwise this form of the invention is the same as that shown in Figs. 1 to 3 and the same reference numerals are applied to like parts.

The side screens 50 in Fig. 4 and 58 in Fig. 5 are preferably independent of the screens 34 and 55 so that there will be no conduction of heat away from the screens 34 and 55 which might result in slightly increasing the broiling time.

From the foregoing it will be apparent to those skilled in this art that I have provided a very simple and efficient means for accomplishing the objects of the invention.

It is to be understood that I am not limited to the specific construction shown and described as various modifications may be made therein within the scope of the appended claims.

What is claimed is:

1. A broiler unit for electric cooking ranges comprising a frame, an exposed electric resistance heating element carried by said frame, screen means supported by said frame in spaced relation to said heating element and disposed in position to intercept flying globules of grease being thrown from broiling meat below said unit, the gauge of said screen means being in the order of 24 to 18, the mesh of said screen means being in the order of three thirty-seconds (³⁄₃₂) of an inch to one fourth (¼) of an inch, and the distance between said screen means and said heating element being in the order of one (1) inch to three eighths (⅜) of an inch, the larger the gauge the larger the mesh and the closer the screen to the heating element.

2. A broiler unit as defined in claim 1 in which said screen means is permanently secured to the lower ends of a plurality of legs extending downwardly from said frame.

3. A broiler unit as defined in claim 2 in which said screen means comprises a horizontally disposed central section and a pair of side sections which extend outwardly and downwardly from opposite sides of said central section.

4. A broiler unit as defined in claim 3 in which said side sections are independent of said central section.

5. A broiler unit as defined in claim 1 in which said screen means comprises a horizontally disposed section permanently secured to the lower ends of a plurality of legs extending downwardly from said frame, and a pair of opposed downwardly and outwardly inclined side sections which are permanently secured directly to said frame.

6. A broiler unit as defined in claim 1 in which said screen means comprises a plurality of horizontally disposed sections and a pair of opposed inclined side sections which are independent of said horizontally disposed sections.

7. A broiler unit for electric cooking ranges comprising a frame, screen means carried by said frame and operative when heated to broil meat placed therebelow, an exposed electric resistance heating element carried by said frame above said screen means in spaced relation thereto and operative when energized to heat said screen means to broiling temperature, the gauge of said screen means being in the order of 24 to 18, the mesh of said screen means being in the order of three thirty-seconds (3/32) of an inch to one fourth (1/4) inch, and the distance between said screen means and said heating element being in the order of one (1) inch to three eighths (3/8) of an inch, the larger the gauge the larger the mesh and the closer the screen to the heating element.

8. A broiler unit as defined in claim 7 in which said screen means is permanently secured to the lower ends of a plurality of legs extending downwardly from said frame.

9. A broiler unit as defined in claim 8 in which said screen means comprises a horizontally disposed central section and a pair of side sections which extend outwardly and downwardly from opposite sides of said central section.

10. A broiler unit as defined in claim 9 in which said side sections are independent of said central section.

11. A broiler unit as defined in claim 7 in which said screen means comprises a horizontally disposed section permanently secured to the lower ends of a plurality of legs extending downwardly from said frame, and a pair of opposed downwardly and outwardly inclined side sections which are permanently secured directly to said frame.

12. A broiler unit as defined in claim 7 in which said screen means comprises a pluraity of horizontally disposed sections and a pair of opposed inclined side sections which are independent of said horizontally disposed section.

References Cited in the file of this patent

UNITED STATES PATENTS

| | | |
|---|---|---|
| 1,118,454 | Weeks | Nov. 24, 1914 |
| 1,282,195 | Clary | Oct. 22, 1918 |
| 2,300,837 | Ames | Nov. 3, 1942 |
| 2,511,790 | Scofield | June 13, 1950 |
| 2,617,008 | Ames | Nov. 4, 1952 |